United States Patent
Nishikawa

(10) Patent No.: US 8,953,710 B2
(45) Date of Patent: Feb. 10, 2015

(54) COMMUNICATION DEVICE AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 106 days.

(21) Appl. No.: 13/857,873

(22) Filed: Apr. 5, 2013

(65) Prior Publication Data

US 2013/0279625 A1    Oct. 24, 2013

(30) Foreign Application Priority Data

Apr. 18, 2012 (JP) ................. 2012-094560

(51) Int. Cl.
*H04L 25/03*     (2006.01)
*H04L 27/26*     (2006.01)

(52) U.S. Cl.
CPC ........ *H04L 27/2601* (2013.01); *H04L 27/2614* (2013.01)
USPC ........................................ 375/296

(58) Field of Classification Search
USPC ............. 375/20, 295–297; 370/203, 206, 210
See application file for complete search history.

(56) References Cited

U.S. PATENT DOCUMENTS

| | | | | |
|---|---|---|---|---|
| 7,627,046 B1 * | 12/2009 | Dick et al. | ..................... | 375/260 |
| 8,817,906 B2 * | 8/2014 | Nishikawa | ..................... | 375/267 |
| 2011/0105056 A1 * | 5/2011 | Noh et al. | ..................... | 455/110 |
| 2011/0176632 A1 * | 7/2011 | Jeong et al. | ..................... | 375/267 |
| 2012/0170532 A1 * | 7/2012 | Kato et al. | ..................... | 370/329 |

FOREIGN PATENT DOCUMENTS

JP    2006-165781    6/2006

* cited by examiner

*Primary Examiner* — Tesfaldet Bocure
(74) *Attorney, Agent, or Firm* — Warner Norcross & Judd LLP

(57) ABSTRACT

The modulator creates modulated signals from input signals. The series/parallel converter creates subcarrier modulated signals from the remaining data and modulated signals. The arithmetic operator arranges and combines a first number of elements of the subcarrier modulated signals from the first one and a second number of elements of a data series from the first one each multiplied by a given amplitude coefficient to create arithmetic operation data. The IFFT executor executes the inverse fast Fourier transformation of the arithmetic operation data. The combiner creates baseband signals from the arithmetic operation results. The determiner calculates the peal-to-average power ratio of the baseband signals. The processing of the arithmetic operator to the determiner is repeated while changing at least one of given numbers until the baseband signals complying with a given criterion are detected. The transmitter creates transmission signals from the baseband signals and transmits the transmission signals via an antenna.

12 Claims, 12 Drawing Sheets

COMMUNICATION DEVICE AND COMMUNICATION METHOD

CROSS-REFERENCE TO RELATED APPLICATION

This application claims the benefit of Japanese Patent Application No. 2012-094560, filed on Apr. 18, 2012, the entire disclosure of which is incorporated by reference herein.

FIELD

This application relates to a communication device and communication method.

BACKGROUND

Unexamined Japanese Patent Application Kokai Publication No. 2006-165781 discloses a communication device and communication method.

The contents of the Unexamined Japanese Patent Application Kokai Publication No. 2006-165781 is incorporated herein.

SUMMARY

In order to achieve the above objective, the communication device according to a first exemplary aspect of the present invention is a communication device communicating with other devices through wireless communication of an orthogonal frequency-division multiplexing communication scheme, comprising:

a modulator modulating input signals with a given modulation scheme, and assigning the elements of remaining data and the elements of the modulated input signals to subcarriers of which the frequency components are orthogonal to each other to create subcarrier modulated signals;

an arithmetic operator arranging in sequence and combining a first number of elements from the first one among the elements of the subcarrier modulated signals and a second number of elements from the first one among the elements of a given data series each multiplied by a given amplitude coefficient to create arithmetic operation data, the given data series comprising a set of data and having such an autocorrelation property that the autocorrelation value to the same data series in which the data are not shifted is higher than the autocorrelation value to a data series in which the data are shifted;

an IFFT executor executing the inverse fast Fourier transformation of the arithmetic operation data;

a combiner combining the arithmetic operation results from the IFFT executor to create baseband signals;

a determiner calculating the peak-to-average power ratio of the baseband signals and determining whether the peak-to-average power ratio complies with a given criterion;

a controller repeatedly executing the processing of the arithmetic operator, IFFT executor, combiner, and determiner while changing at least one of the first and second numbers until the baseband signals of which the peak-to-average power ratio complies with the given criterion are detected;

an updater updating the remaining data with data comprising the elements that are not contained in the arithmetic operation data corresponding to the baseband signals complying with the given criterion among the elements of the subcarrier modulated signals; and a transmitter creating transmission signals from the baseband signals complying with the given criterion and transmitting the transmission signals.

Preferably, the arithmetic operator uses a CAZAC (constant amplitude zero auto-correlation) series as the data series.

The communication device according to a second exemplary aspect of the present invention is a communication device communicating with other devices through wireless communication of an orthogonal frequency-division multiplexing communication scheme, comprising:

a receiver receiving transmission signals and creating baseband signals;

a series/parallel converter series/parallel-converting the baseband signals to create parallel signals;

an FFT executor executing the fast Fourier transformation of the parallel signals to create converted data;

a shifter shifting a given data series in a given direction to create a receiving end data series, the given data series comprising a set of data and having such an autocorrelation property that the autocorrelation value to the same data series in which the data are not shifted is higher than the autocorrelation value to a data series in which the data are shifted;

a correlation determiner determining whether there is any correlation between two data created from the receiving end data series and from the parallel signals;

a receiving end controller repeating the processing of the shifter and correlation determiner while changing the number of times of shifting the data series until the correlation determiner determines that there is any correlation;

an extractor determining given elements to extract from the converted data based on the given direction and number of times of data shifting used by the shifter and extracting the given elements from the converted data to create subcarrier modulated signals in order to create the receiving end data series used by the correlation determiner for determining the correlation; and a demodulator demodulating the subcarrier modulated signals with a given demodulation scheme.

Preferably, the shifter executes the inverse fast Fourier transformation of the created receiving end data series, and the correlation determiner determines whether there is any correlation between the results of the inverse fast Fourier transformation of the receiving end data series and the parallel signals.

Alternatively, the correlation determiner may determine whether there is any correlation between the receiving end data series and the converted data.

Preferably, the shifter uses a CAZAC (constant amplitude zero auto-correlation) series as the data series.

The communication method according to a third exemplary aspect of the present invention is a communication method executed by a communication device communicating with other devices through wireless communication of an orthogonal frequency-division multiplexing communication scheme, comprising:

a modulation step of modulating input signals with a given modulation scheme, and assigning the elements of remaining data and the elements of the modulated input signals to subcarriers of which the frequency components are orthogonal to each other to create subcarrier modulated signals;

an arithmetic operation step of arranging in sequence and combining a first number of elements from the first one among the elements of the subcarrier modulated signals and a second number of elements from the first one among the elements of a given data series each multiplied by a given amplitude coefficient to create arithmetic operation data, the given data series comprising a set of data and having such an auto-correlation property that the autocorrelation value to the same data series in which the data are not shifted is higher than the autocorrelation value to a data series in which the data are shifted;

an IFFT step of executing the inverse fast Fourier transformation of the arithmetic operation data;

a combining step of combining the arithmetic operation results in the IFFT step to create baseband signals;

a determination step of calculating the peak-to-average power ratio of the baseband signals and determining whether the peak-to-average power ratio complies with a given criterion;

a control step of repeatedly executing the processing in the arithmetic operation, IFFT, combining, and determination steps while changing at least one of the first and second numbers until the baseband signals of which the peak-to-average power ratio complies with the given criterion are detected;

an update step of updating the remaining data with data comprising the elements that are not contained in the arithmetic operation data corresponding to the baseband signals complying with the given criterion among the elements of the subcarrier modulated signals; and a transmission step of creating transmission signals from the baseband signals complying with the given criterion and transmitting the transmission signals.

Preferably, in the arithmetic operation step, a CAZAC (constant amplitude zero auto-correlation) series is used as the data series.

The communication method according to a fourth exemplary aspect of the present invention is a communication method executed by a communication device communicating with other devices through wireless communication of an orthogonal frequency-division multiplexing communication scheme, comprising:

a reception step of receiving transmission signals and creating baseband signals;

a series/parallel step of series/parallel-converting the baseband signals to create parallel signals;

an FFT step of executing the fast Fourier transformation of the parallel signals to create converted data;

a shift step of shifting a given data series number of times in a given direction to create a receiving end data series, the given data series comprising a set of data and having such an autocorrelation property that the autocorrelation value to the same data series in which the data are not shifted is higher than the autocorrelation value to a data series in which the data are shifted;

a correlation determination step of determining whether there is any correlation between two data created from the receiving end data series and from the parallel signals;

a receiving end control step of repeating the shift step and correlation determination step while changing the number of times of shifting the data series until it is determined that there is any correlation in the correlation determination step;

an extraction step of determining given elements to extract from the converted data based on the given direction and number of times of data shifting used in the shift step and extracting the given elements from the converted data to create subcarrier modulated signals in order to create the receiving end data series used for determining the correlation in the correlation determination step; and a demodulation step of demodulating the subcarrier modulated signals with a given demodulation scheme.

Preferably, in the shift step, the inverse fast Fourier transformation of the created receiving end data series is executed, and in the correlation determination step, it is determined whether there is any correlation between the results of the inverse fast Fourier transformation of the receiving end data series and the parallel signals.

Alternatively, in the correlation determination step, it may be determined whether there is any correlation between the receiving end data series and the converted data.

Preferably, in the shift step, a CAZAC (constant amplitude zero auto-correlation) series is used as the data series.

BRIEF DESCRIPTION OF THE DRAWINGS

A more complete understanding of this application can be obtained when the following detailed description is considered in conjunction with the following drawings, in which.

DETAILED DESCRIPTION

In the OFDM (Orthogonal Frequency-Division Multiplexing) communication, baseband signals are created from input signals through subcarrier modulation and IFFT (inverse fast Fourier transformation). Therefore, as the number of subcarriers is increased and the FFT (fast Fourier transformation) size is increased, the created baseband signals have a large peak and characteristically have a high PAPR (peak-to-average power ratio). As the PAPR becomes higher, a wide-range linear amplifier is required to transfer the signals in a distortion-free manner. Then, techniques for lowering the PAPR have been developed.

In Unexamined Japanese Patent Application Kokai Publication No. 2006-165781, the phase of subcarrier modulated signals are controlled based on the optimum phase calculated by a sequential decision method prior to the IFFT in order to lower the PAPR.

Lowering the PAPR is an issue with the OFDM communication. In the Unexamined Japanese Patent Application Kokai Publication No. 2006-165781, computation is repeated to calculate the optimum phase for lowering the PAPR and the phase has to be controlled on the subcarrier basis. Furthermore, the technique disclosed in Patent Literature 1 cannot control the degree of the PAPR being lowered.

The technique of this embodiment allows for lowering the PAPR and controlling the degree of the PAPR being lowered in the OFDM communication.

An embodiment of the present invention will be described in detail hereafter with reference to the drawings. In the figures, the same or equivalent components are referred to by the same reference numbers. In the following explanation, the IFFT (inverse fast Fourier transformation) conceptually includes the IFFT and the IDFT (inverse discrete Fourier transformation). Therefore, the IFFT can be replaced with the IDFT in the embodiment of the present invention. Similarly, the FFT (fast Fourier transformation) conceptually includes the FFT and the DFT (discrete Fourier transformation). Additionally, in the case of executing the IDFT and DFT, the FFT size in the following explanation means the DFT size.

Figure 1:
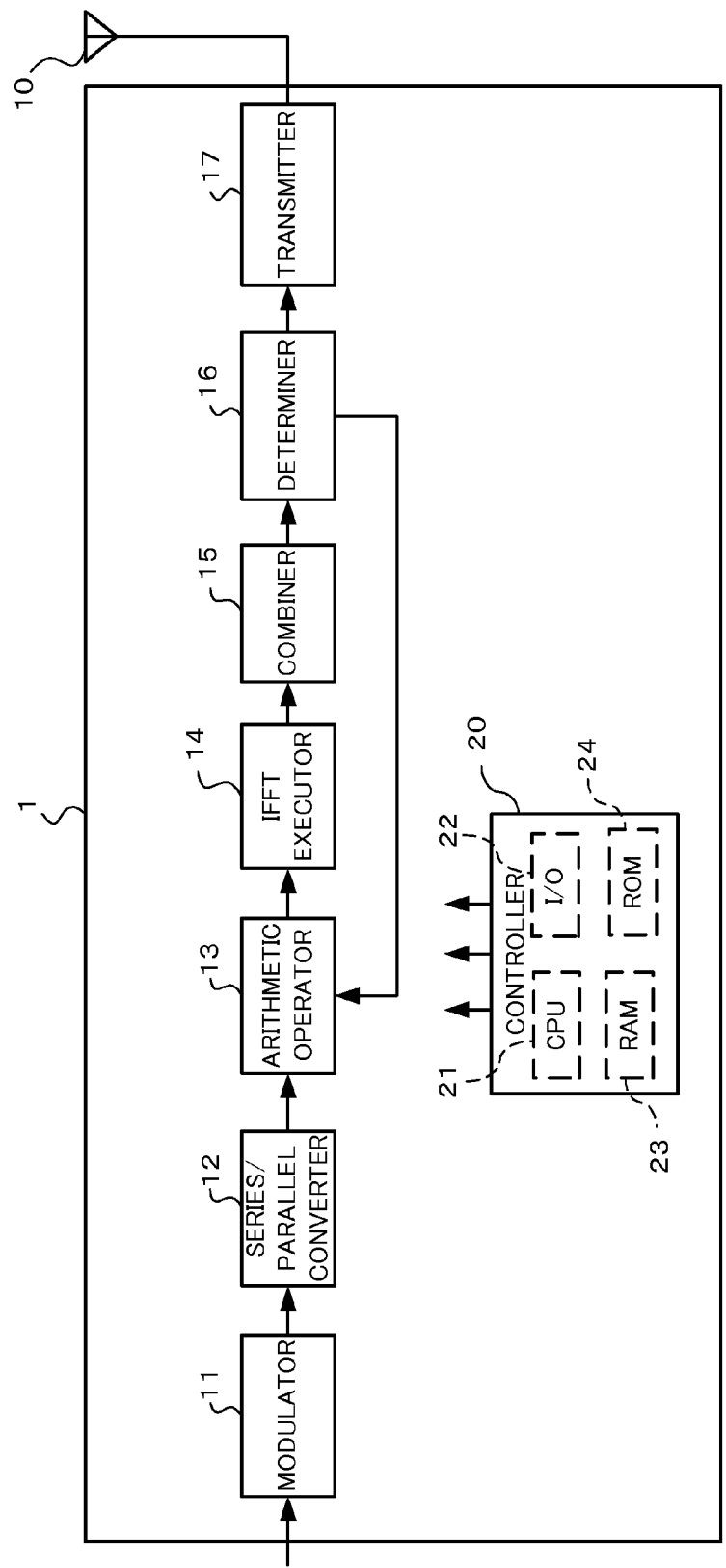
FIG. 1 is a block diagram showing an exemplary configuration of the communication device according to an embodiment of the present invention.

FIG. 1 is a block diagram showing an exemplary configuration of the communication device according to an embodiment of the present invention. A communication device 1 communicates with other devices through wireless communication of an OFDM (orthogonal frequency-division multiplexing) scheme. The communication device 1 comprises an antenna 10, a modulator 11, a series/parallel converter 12, an arithmetic operator 13, an IFFT executor 14, a combiner 15, a determiner 16, a transmitter 17, and a controller 20.

The controller 20 comprises a CPU (central processing unit) 21, a RAM (random access memory) 23, and a ROM (read only memory) 24. Signal lines from the controller 20 to the components are omitted for preventing complexity and for easier understanding. However, the controller 20 is connected to the components of the communication device 1 via an I/O (input/output) 22 to control the start, end, and contents of processing of the components.

The RAM 23 stores, for example, data for creating a transmission frame. The ROM 24 stores control programs for the controller 20 to control the operation of the communication device 1. The controller 20 controls the communication device 1 based on the control programs.

Figure 2:
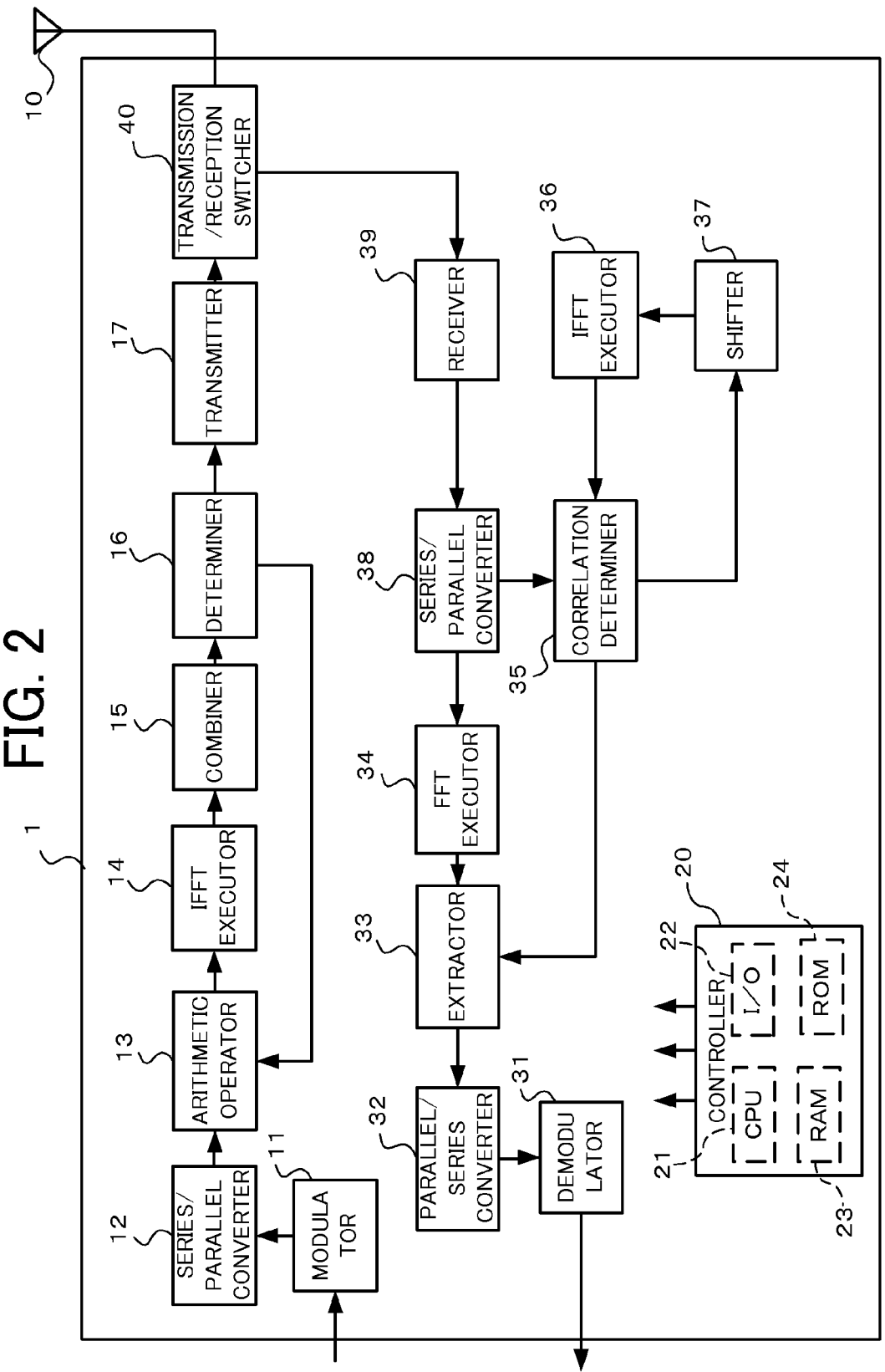
FIG. 2 is a block diagram showing another exemplary configuration of the communication device according to the embodiment.

FIG. 2 is a block diagram showing another exemplary configuration of the communication device according to the embodiment. In order for the communication device 1 to have reception capability, the communication device 1 shown in FIG. 2 further comprises a demodulator 31, a parallel/series converter 32, an extractor 33, an FFT executor 34, a correlation determiner 35, an IFFT executor 36, a shifter 37, a series/parallel converter 38, a receiver 39, and a transmission/reception switcher 40. The communication method executed by the communication device 1 will be described hereafter using the communication device 1 shown in FIG. 2 that comprises transmission capability and reception capability.

The modulator 11 modulates input signals with a given modulation scheme to create modulated signals, and sends the modulated signals to the series/parallel converter 12. The modulation scheme is, for example, QPSK (quadrature phase-shift keying). The series/parallel converter 12 series/parallel-concerts the modulated signals, and assigns the elements of remaining data and the elements of the series/parallel-converted modulated signals to subcarriers of which the frequency components are orthogonal to each other so as to create subcarrier modulated signals. Then, the subcarrier modulated signals are sent to the arithmetic operator 13. The remaining data are data comprising the elements of the subcarrier modulated signals that are not sent as described later.

Using any data series comprising a set of data and having an autocorrelation property, the arithmetic operator 13 arranges in sequence and combines a first number of elements from the first one among the elements of the subcarrier modulated signals and a second number of elements from the first one among the elements of the data series each multiplied by an amplitude coefficient that is a given real number to create arithmetic operation data. Any data series having an autocorrelation property is a data series of which the autocorrelation value to the same data series in which no data shift is conducted is higher than the autocorrelation value to a data series in which any data shift is conducted. The data series in which any data shift is conducted is different in value of at least one element from the data series in which no data shift is conducted. For example, a CAZAC (constant amplitude zero auto-correlation) series can be used as such a data series.

Here, assuming that there are no data in the remaining data and the subcarrier modulated signals have N elements, the elements of a subcarrier modulated signal d result from modulating input signals with a given modulation scheme and are presented by the formula (1) below.

[Math 1]

$$d = \begin{bmatrix} d_1 \\ d_2 \\ \vdots \\ d_N \end{bmatrix} \quad (1)$$

The arithmetic operator 13 utilizes a CAZAC series having N elements and presented by the formula (2) below.

[Math 2]

$$c = \begin{bmatrix} c_1 \\ c_2 \\ \vdots \\ c_N \end{bmatrix} \quad (2)$$

Here, when the number of elements of arithmetic operation data is fixed to N by way of example and the first number is p, then the second number is presented by N−p. The arithmetic operation data d' are presented by the formula (3) below in which a is the amplitude coefficient.

[Math 3]

$$d' = \begin{bmatrix} d_1 \\ \vdots \\ d_p \\ a \cdot c_1 \\ \vdots \\ a \cdot c_{N-p} \end{bmatrix} \quad (3)$$

The arithmetic operator 13 sends the arithmetic operation data d' to the IFFT executor 14. The IFFT executor 14 executes the IFFT of the arithmetic operation data d' and sends the arithmetic operation results to the combiner 15. The combiner 15 combines the arithmetic operation results from the IFFT executor 14 to create baseband signals and sends the baseband signals to the determiner 16.

The determiner 16 calculates the PAPR (peak-to-average power ratio) of the baseband signals, and determines whether the PAPR complies with a given criterion. The determiner 16 notifies the arithmetic operator 13 of the determination result. If the PAPR of the baseband signals does not comply with the given criterion, the arithmetic operator 13 changes at least one of the first and second numbers, and creates new arithmetic operation data. The IFFT executor 14, combiner 15, and determiner 16 repeat the above processing based on the new arithmetic operation data until the baseband signals of which the PAPR complies with the given criterion are detected. The controller 20 controls the arithmetic operator 13, IFFT executor 14, combiner 15, and determiner 16 to repeat the above processing, thus operating as a control means.

If the PAPR of the baseband signals complies with the given criterion, the determiner 16 sends the baseband signals to the transmitter 17. The determiner 16 can be configured, for example, to detect the baseband signals of which the PAPR is lower than a given value or detect the baseband signals of which the PAPR is the lowest after repeating the above processing a given number of times.

If the PAPR of the baseband signals created based on the arithmetic operation data presented by the above formula (3) complies with a given criterion, the p+1-th and subsequent elements of the subcarrier modulated signals are not contained in the arithmetic operation data and therefore not sent. Notified of the determination result from the determiner 16, the arithmetic operator 13 updates the remaining data with the elements of the subcarrier modulated signals that are not contained in the arithmetic operation data corresponding to the baseband signals complying with the given criterion, namely with data comprising the p+1-th and subsequent elements of the subcarrier modulated signals in the above example. The arithmetic operator 13 executes the above arithmetic operation and updates the remaining data, thus operating as an arithmetic operation means and an update means. Subsequently, the modulator 11 creates modulated signals from subsequent input signals and sends the modulated signals to the series/parallel converter 12. Then, the series/parallel converter 12 creates new subcarrier modulated signals based on the p+1-th and subsequent elements that are not contained in the arithmetic operation data and the modulated signal created from the subsequent input signals.

The transmitter 17 creates transmission signals from the received baseband signals and sends the transmission signals to another device via the transmission/reception switcher 40 and antenna 10.

Figure 3:
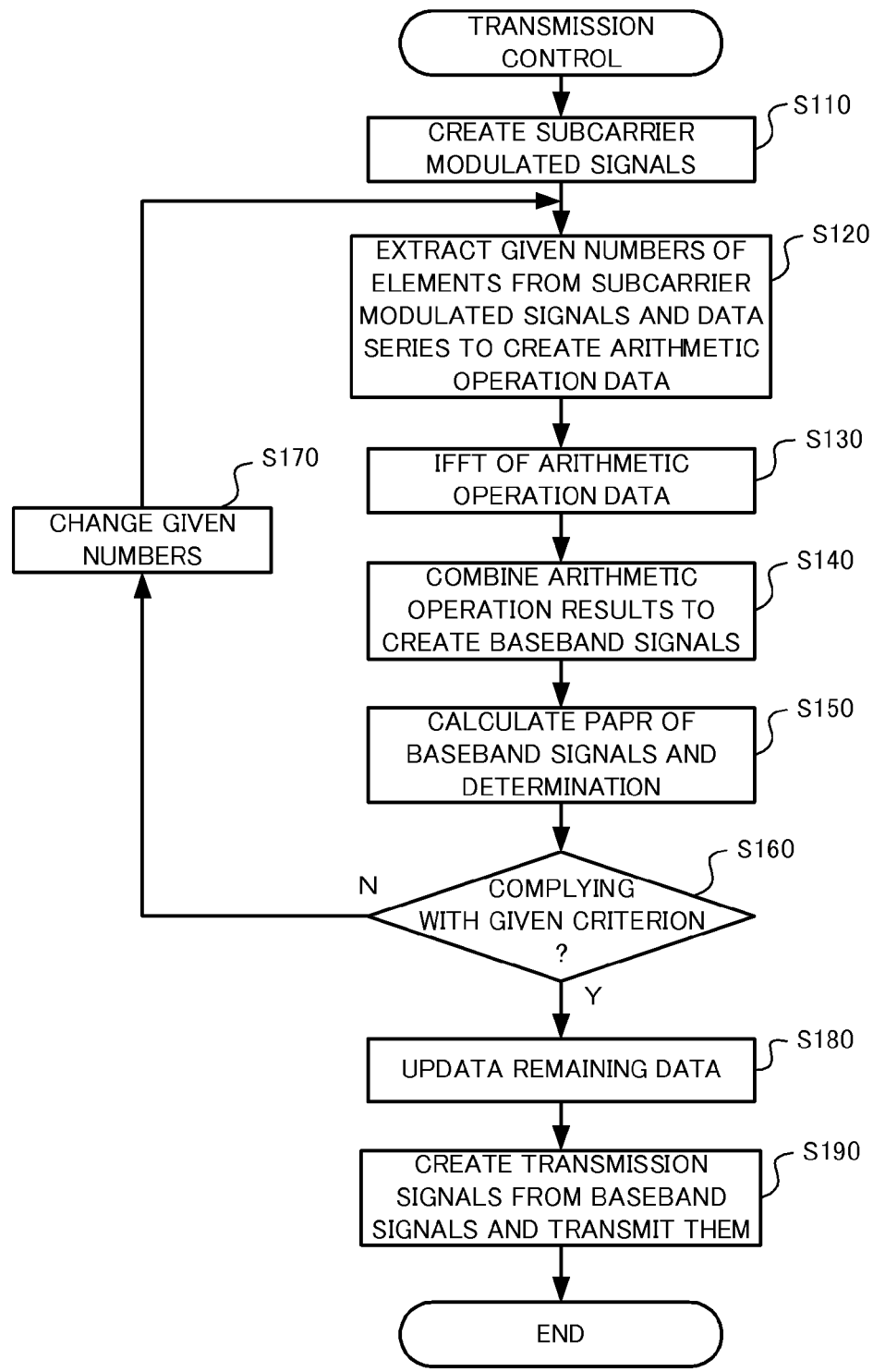
FIG. 3 is a flowchart showing an example of the transmission control operation executed by the communication device according to the embodiment.

FIG. 3 is a flowchart showing an example of the transmission control operation executed by the communication device according to the embodiment. The modulator 11 modulates input signals with a given modulation scheme and creates modulated signals. The series/parallel converter 12 series/parallel-converts the modulated signals, and assigns them to subcarriers of which the frequency components are orthogonal to each other to create subcarrier modulated signals (Step S110). The arithmetic operator 13 arranges in sequence and combines a first number of elements from the first one among the elements of the subcarrier modulated signals and a second number of elements from the first one among the elements of a data series each multiplied by an amplitude coefficient that is a given real number to create arithmetic operation data (Step S120).

The IFFT executor 14 executes the IFFT of the arithmetic operation data (Step S130). The combiner 15 combines the arithmetic operation results from the IFFT executor 14 to create baseband signals (Step S140). The determiner 16 calculates the PAPR of the baseband signals and determines whether the PAPR of the basebands complies with a given criterion (Step S150). If it does not comply with a given criterion (Step S160: N), the arithmetic operator 13 changes at least one of the first and second numbers (Step S170). Then, returning to the Step S120, the above processing is repeated. If the PAPR of the baseband signals complies with a given criterion (Step S160: Y), the arithmetic operator 13 updates the remaining data with data comprising the elements that are not contained in the arithmetic operation data corresponding to the baseband signals complying with the given criterion among the elements of the subcarrier modulated signals (Step S180). The transmitter 17 creates transmission signals from the baseband signals, and sends the transmission signals to another device via the transmission/reception switcher 40 and antenna 10 (Step S190). After the transmission in the Step S190 is completed, the procedure ends.

The processing at the receiving end will be described hereafter. The receiver 39 receives the transmission signals via the antenna 10 and transmission/reception switcher 40, creates baseband signals, and sends the baseband signals to the series/parallel converter 38. The series/parallel converter 38 series/parallel-converts the baseband signals to create parallel signals and sends the parallel signals to the FFT executor 34 and correlation determiner 35. The FFT executor 34 executes the FFT of the parallel signals to create converted data and sends the converted data to the extractor 33.

The shifter 37 shifts a given data series comprising a set of data and having an autocorrelation property a given number of times in a given direction to create a receiving end data series. The data series having an autocorrelation property means a data series of which the autocorrelation value to the same data series in which no data shift is conducted is higher than the autocorrelation value to a data series in which any data shift is conducted, and the same data series as used in the transmitting end arithmetic operator 13. The shifter 37 sends the receiving end data series to the IFFT executor 36. The IFFT executor 36 executes the IFFT of the receiving end data series and sends the arithmetic operation results to the correlation determiner 35. The shifter 37 and IFFT executor 36 cooperate to execute the operation as a shift means.

The correlation determiner 35 determines whether there is any correlation between the IFFT arithmetic operation results of the receiving end data series and the parallel signals, which are two data created from the receiving end data series and the parallel signals. The correlation determiner 35 determines the presence/absence of correlation based on, for example, whether a correlation value presenting the presence/absence of correlation is higher than a given value. If there is no correlation, the correlation determiner 35 notifies the shifter 37 accordingly. The shifter 37 changes the number of times of shifting and creates the receiving end data series, the IFFT executor 36 executes the IFFT of the receiving end data series, and the correlation determiner 35 determines whether there is any correlation between the IFFT arithmetic operation results of the receiving end data series and the parallel signals; this processing is repeated until it is determined that there is any correlation. The controller 20 controls the shifter 37, IFFT executor 36, and correlation determiner 35 to repeat the above processing, thus operating as a receiving end control means. If there is any correlation, the correlation determiner 35 sends the direction and number of times of data shifting used by the shifter 37 to create the receiving end data series to the extractor 33.

Alternatively, upon creation of the receiving end data series by the shifter 37, it is possible that the above processing executed by the shifter 37, IFFT executor 36, and correlation determiner 35 is repeated for all possible numbers of times of shifting in a specific shift direction, and the correlation determiner 35 sends the direction and number of times of data shifting that maximize the correlation value to the extractor 33.

It is also possible that the shifter 37 sends the direction and number of times of data shifting to the extractor 33 via the IFFT executor 36 and correlation determiner 35. Alternatively, it is also possible that the direction and number of times of data shifting are stored in the RAM 23 and the extractor 33 acquires the direction and number of times of data shifting from the RAM 23.

Figure 4:
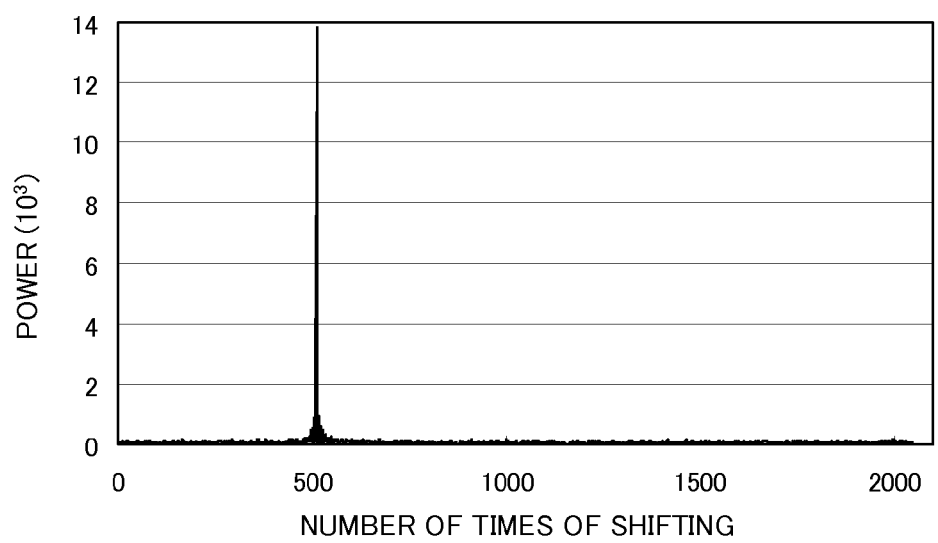
FIG. 4 is a graphical representation showing an exemplary correlation between the IFFT arithmetic operation results of a receiving end data series and the parallel signals in the embodiment.

FIG. 4 is a graphical representation showing an exemplary correlation between the IFFT arithmetic operation results of a receiving end data series and the parallel signals in the embodiment. The number of times of shifting is plotted as abscissa and the power indicating the presence/absence of correlation is plotted as ordinate. At the transmitting end, the first 512 elements of the subcarrier modulated signals created based on input signals that are random data and the first 1536 elements among the elements of a data series are arranged in sequence to create arithmetic operation data. In this case, the results shown in FIG. 4 are obtained by using a receiving end data series created by the shifter 37 shifting a given data series a given number of times downward, and analyzing the correlation between the IFFT arithmetic operation results of the receiving end data series and the parallel signals for each possible value of the given number of times. In FIG. 4, the power has a peak value when the number of times of shifting is 512. The IFFT arithmetic operation results of the receiving end data series and the parallel signals are correlated when the number of times of shifting is 512. Therefore, it is known that the first 512 data among the converted data are subcarrier modulated signals.

The extractor 33 determines given elements to extract from the converted data based on the received direction and number of times of data shifting, and extracts the given elements from the converted data to create subcarrier modulated signals. In the example shown in FIG. 4, the first 512 data among the converted data are extracted to create subcarrier modulated signals. The extractor 33 sends the subcarrier modulated signals to the parallel/series converter 32.

The parallel/series converter 32 parallel/series-converts the subcarrier modulated signals to create series signals and sends the series signals to the demodulator 31. The demodulator 31 demodulates the series signals with a given demodulation scheme. For example, the demodulator 31 executes the QPSK demodulation of the series signals. Consequently, the input signals modulated by the modulator 11 are demodulated by the demodulator 31 and output.

Figure 5:
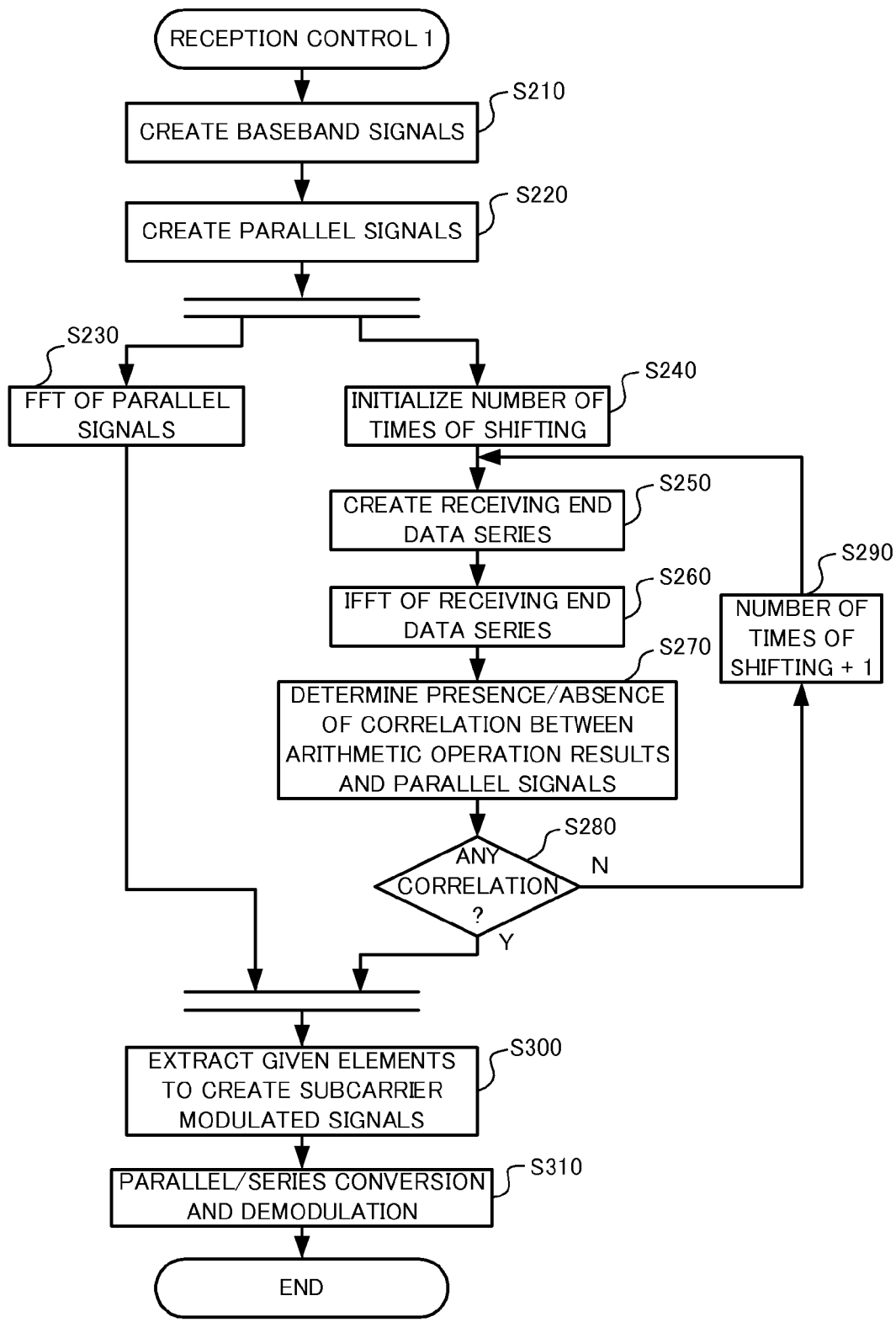
FIG. 5 is a flowchart showing an example of the reception control operation executed by the communication device according to the embodiment.

FIG. 5 is a flowchart showing an example of the reception control operation executed by the communication device according to the embodiment. The receiver 39 receives transmission signals via the antenna 10 and transmission/reception switcher 40 and creates baseband signals (Step S210). The series/parallel converter 38 series/parallel-converts the baseband signals to create parallel signals (Step S220). The FFT executor 34 executes the FFT of the parallel signals to create converted data (Step S230).

The shifter 37 initializes the number of times of shifting to zero (Step S240). The shifter 37 shifts a given data series the number of times of shifting in a given direction to create a receiving end data series (Step S250). The IFFT executor 36 executes the IFFT of the receiving end data series (Step S260). The correlation determiner 35 determines whether there is any correlation between the IFFT arithmetic operation results of the receiving end data series and the parallel signals (Step S270).

If there is no correlation (Step S280: N), one is added to the number of times of shifting (Step S290). Then, returning to the Step 250, the above processing is repeated. If there is any correlation (Step S280: Y), the extractor 33 determines given elements to extract from the converted data based on the given direction and number of times of data shifting, and extracts the given elements from the converted data to create subcarrier modulated signals (Step S300). The parallel/series converter 32 parallel/series-converts the subcarrier modulated signals to create series signals. The demodulator 31 demodulates the series signals with a given demodulation scheme (Step S310).

Figure 6:
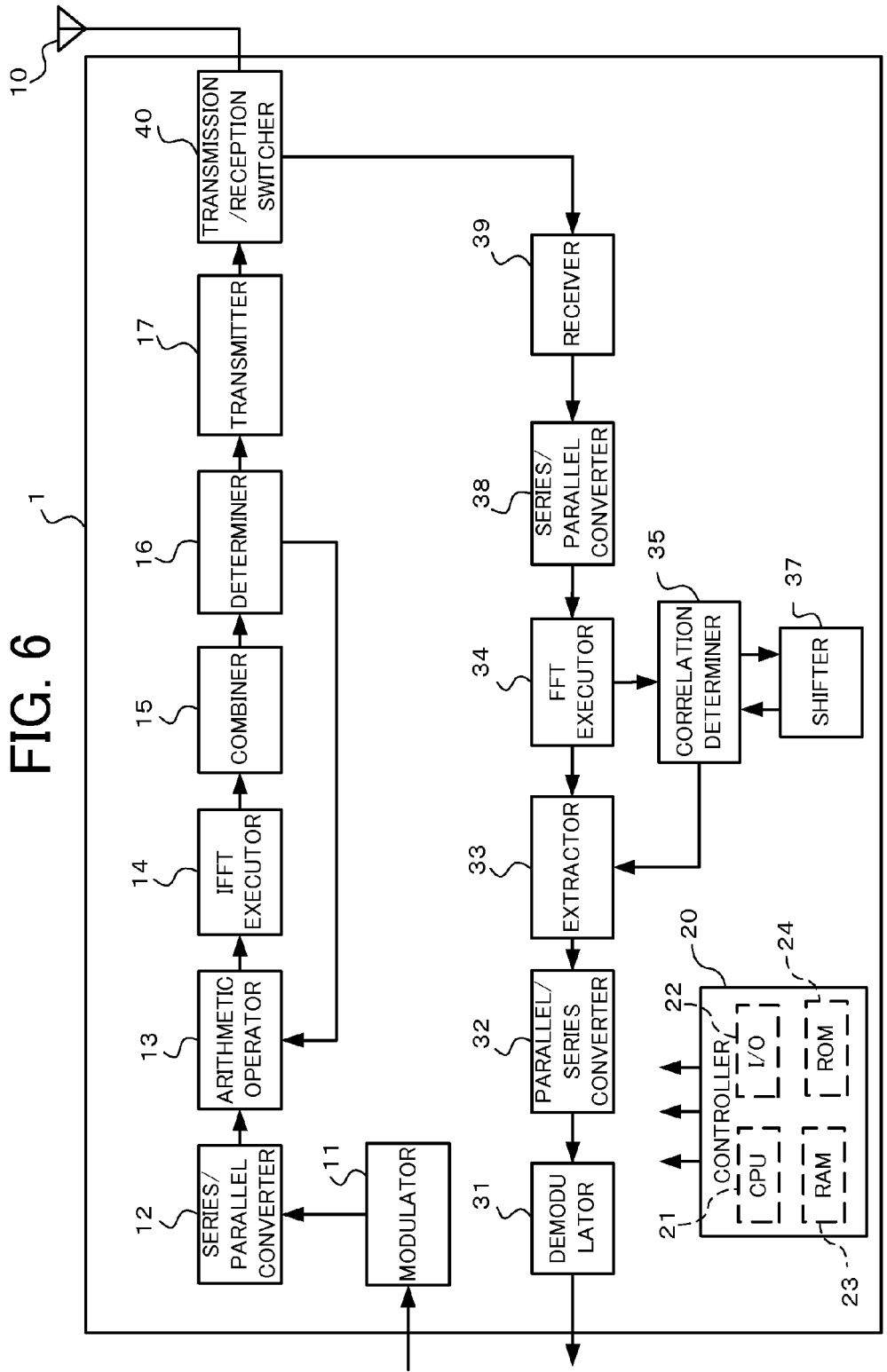
FIG. 6 is a block diagram showing another exemplary configuration of the communication device according to the embodiment.

In the above-described embodiment, the elements to be extracted by the extractor 33 is determined based on the correlation between the IFFT arithmetic operation results of the receiving end data series and the parallel signals. However, the given elements to be extracted by the extractor 33 can be determined based on the correlation between the receiving end data series and the converted data. FIG. 6 is a block diagram showing another exemplary configuration of the communication device according to the embodiment.

The communication device 1 shown in FIG. 6 is different from the communication device 1 shown in FIG. 2 in that the IFFT executor 36 is omitted and the correlation determiner 35 and shifter 37 are positioned differently. The receiving end processing different from the communication device 1 shown in FIG. 2 will be described.

The series/parallel converter 38 series/parallel-converts the baseband signals to create parallel signals and sends the parallel signals to the FFT executor 34. The FFT executor 34 executes the FFT of the parallel signals to create converted data and sends the converted data to the extractor 33 and correlation determiner 35. The shifter 37 creates a receiving end data series as the communication device 1 shown in FIG. 2 does. The shifter 37 sends the receiving end data series to the correlation determiner 35.

The correlation determiner 35 determines whether there is any correlation between the receiving end data series and converted data, which are two given data created from the receiving end data series and from the parallel signals. If there is no correlation, the correlation determiner 35 notifies the shifter 37 accordingly. The shifter 37 changes the given number of times and creates a receiving end data series and the correlation determiner 35 determines whether there is any correlation between the receiving end data series and converted data; this processing is repeated until it is determined that there is any correlation. The controller 20 controls the shifter 37 and correlation determiner 35 to repeat the above processing, thus also operating as a receiving end control means.

If there is any correlation, the correlation determiner 35 sends the direction and number of times of data shifting used by the shifter 37 to create the receiving end data series to the extractor 33. The direction and number of times of data shifting can be sent from the shifter 37 to the extractor 33 via the correlation determiner 35. Alternatively, it is also possible that the direction and number of times of shifting are stored in the RAM 23 and acquired by the extractor 33 from the RAM 23.

Figure 7:
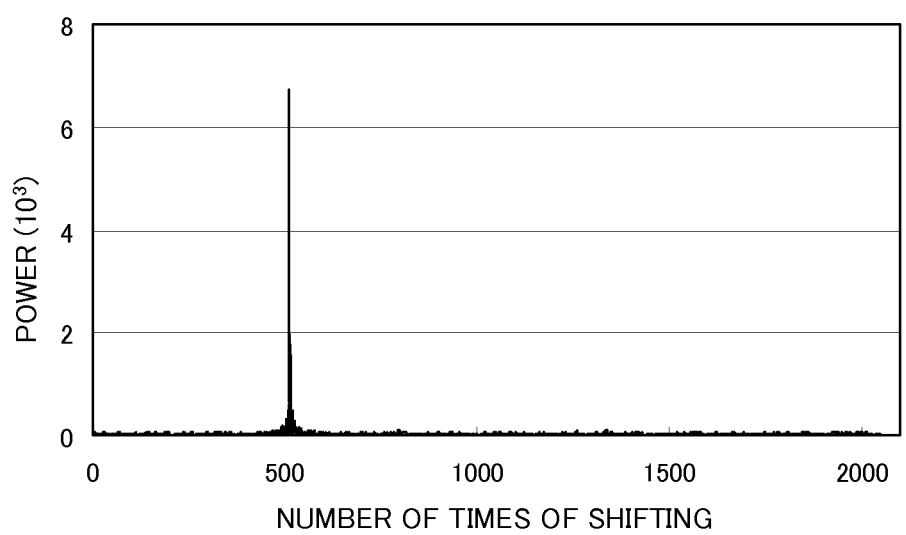
FIG. 7 is a graphical representation showing an exemplary correlation between the receiving end data series and the converted data in the embodiment.

FIG. 7 is a graphical representation showing an exemplary correlation between the receiving end data series and converted data in the embodiment. The number of times of shifting is plotted as abscissa and the power presenting the presence/absence of correlation is plotted as ordinate. At the transmitting end, the first 512 elements of the subcarrier modulated signals created based on input signals that are random data and the first 1536 elements among the elements of a data series are arranged in sequence to create arithmetic operation data. In this case, the results shown in FIG. 7 are obtained by using a receiving end data series created by the shifter 37 shifting a given data series a specific number of times downward, and analyzing the correlation between the receiving end data series and the converted data for each possible value of the given number of times. In FIG. 7, the power has a peak value when the number of times of shifting is 512. The IFFT operation results of the receiving end data series and the parallel data are correlated when the number of times of shifting is 512. Therefore, it is known that the first 512 data of the converted data are subcarrier modulated signals. The subsequent processing is the same as that of the communication device 1 shown in FIG. 2.

Figure 8:
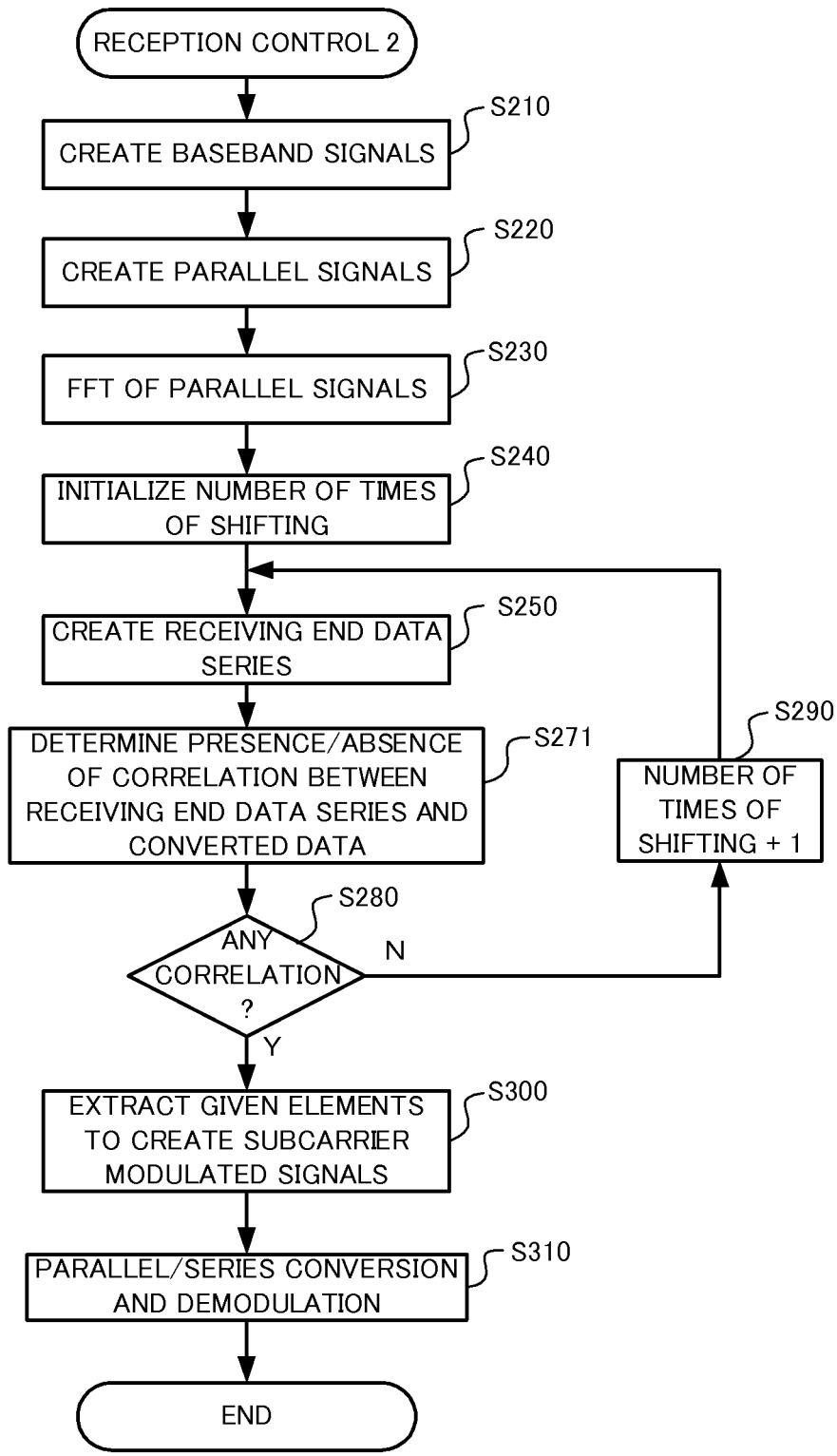
FIG. 8 is a flowchart showing another example of the reception control operation executed by the communication device according to the embodiment.

FIG. 8 is a flowchart showing another example of the reception control operation executed by the communication device according to the embodiment. The processing in the Steps S210 to S250 is the same as in FIG. 5. However, the processing in the Step S230 and the processing in the Steps S240 to S290 are executed in parallel in the flowchart shown in FIG. 5 while the processing in these steps is executed in sequence in the flowchart shown in FIG. 8. Then, the correlation determiner 35 determines whether there is any correlation between the receiving end data series and converted data (Step S271). The processing in the Step S280 to S310 is also the same as in FIG. 5.

As described above, the communication device 1 according to the embodiment of the present invention can lower the PAPR by creating baseband signals through the IFFT of data created by arranging a first number of elements of the subcarrier modulated signals and a second number of elements of a data series for combining in the OFDM communication scheme. Furthermore, as described later, the PAPR can be lowered and the degree of the PAPR being lowered can be controlled.

EMBODIMENTS

Figure 9:
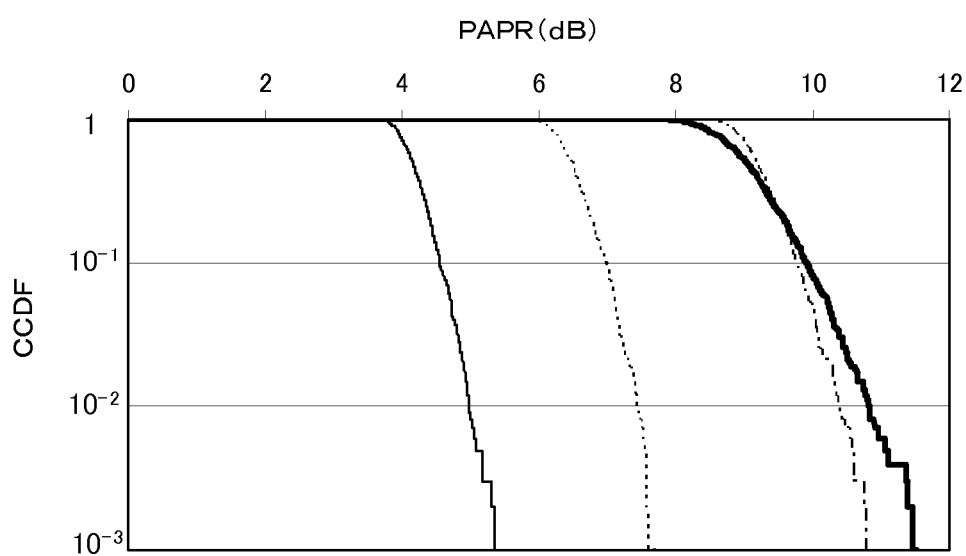
FIG. 9 is a graphical representation showing simulated CCDF characteristics.

The effect of the invention according to the embodiment will be described hereafter using simulation. Using a modulation scheme of QPSK and a FFT size of 2048, the characteristics of the CCDF (complementary cumulative distribution function) of a PAPR, namely the probability of occurrence of a PAPR, were compared. FIG. 9 is a graphical representation showing simulated CCDF characteristics. The PAPR is plotted as abscissa (unit: dB) and the PAPR CCDF is plotted as ordinate. The prior art means the method of creating baseband signals from subcarrier modulated signals without the above-described arithmetic operation. In the simulation of this embodiment, the number of elements of the arithmetic operation data was 2048 and different values, 512, 1024, and 1036, of the first number p, which is the number of elements of the subcarrier modulated signals in the arithmetic operation data, were used.

The prior art PAPR CCDF characteristic is presented by the thick solid line graph. The CCDF characteristics of this embodiment when p=512, 1024, and 1536 are presented by the thin solid line graph, dotted line graph, and dot-dash line graph, respectively. In the range shown in the figure, the PAPRs of the invention according to this embodiment are all lowered compared with the prior art. Furthermore, it is understood that the PAPR is further lowered as the first number p is lowered. However, the transmission rate is deteriorated as the first number p is lowered.

Figure 10:
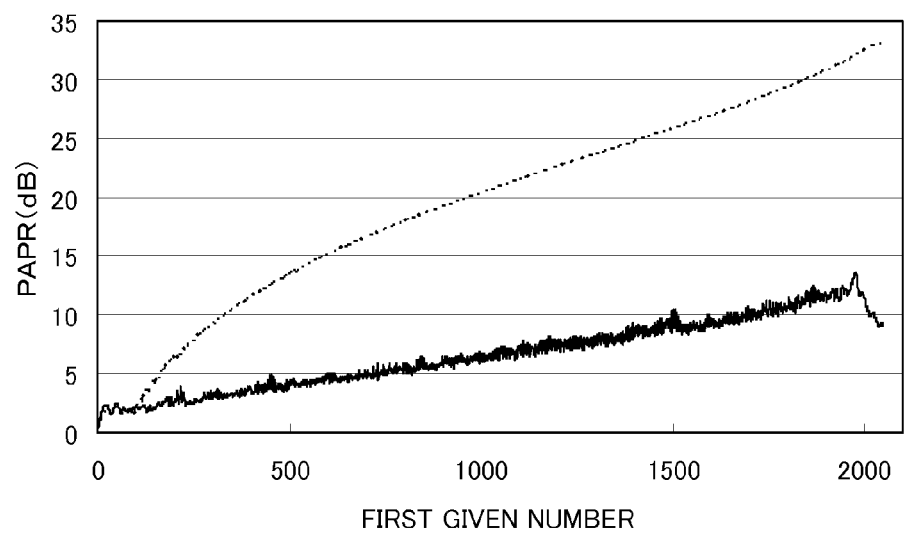
FIG. 10 is a graphical representation showing the relationship between simulated PAPR characteristics and the number of elements of subcarrier modulated signals contained in the arithmetic operation data.

Using a modulation scheme of QPSK, a FFT size of 2048, and random signals or identical signals as input signals, simulation was conducted in which different values of the first number p were used. The identical signals means that the elements of subcarrier modulated signals have the same phase. FIG. 10 is a graphical representation showing the relationship between simulated PAPR characteristics and the number of elements of subcarrier modulated signals contained in arithmetic operation data. The first number p is plotted as abscissa and the PAPR is plotted as ordinate (unit: dB). The solid line graph presents the case in which the input signals are random signals. The dotted line graph presents the case in which the input signals are identical signals. The PAPR when the first number is 2048 corresponds to the prior art PAPR.

It is understood that the PAPR is lowered as the first number p is lowered. Furthermore, when the input signals are random signals, the PAPR is deteriorated compared with the prior art in some range. It is possible to prevent the PAPR from deteriorating compared with the prior art by setting a given criterion so that the determiner 16 does not detect the PAPR deteriorated compared with the prior art.

Figure 11:
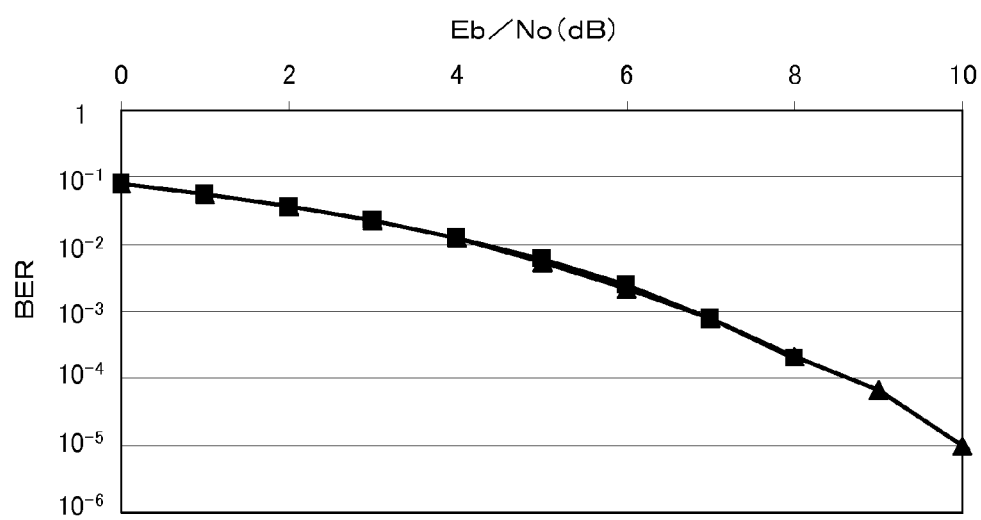
FIG. 11 is a graphical representation showing simulated BER characteristics.

Using a modulation scheme of QPSK and a FFT size of 2048, simulation of BER was conducted. FIG. 11 is a graphical representation showing simulated BER characteristics. The Eb/No (energy per bit to noise power spectral density ratio) is plotted as abscissa and the BER is plotted as ordinate. The Eb/No is presented in dB. In this embodiment, the simulation was conducted with the first number p of 1024. The prior art BER is presented by the graph plotted with squares. The BER of the invention according to this embodiment is presented by the graph plotted with triangles. It is understood that there is no significant difference in BER between the prior art and the invention according to this embodiment. Similar results were obtained with different values of the first number p.

Figure 12:
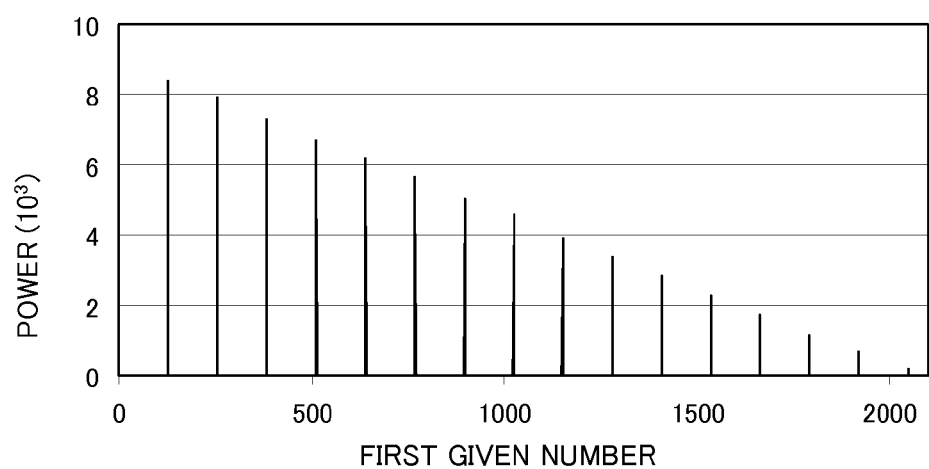
FIG. 12 is a graphical representation showing the relationship of the correlation between the IFFT arithmetic operation results of a receiving end data series and the parallel signals with the number of elements of subcarrier modulated signals contained in the arithmetic operation data.

Using a modulation scheme of QPSK, a FFT size of 2048, random signals as the input signals, and different values of the first number p, simulation was conducted in which the peak correlation value was detected by the receiving end correlation determiner 35. FIG. 12 is a graphical representation showing the relationship of the correlation between the IFFT arithmetic operation results of a receiving end data series and the parallel signals with the number of elements of the subcarrier modulated signals contained in the arithmetic operation data. The first number p is plotted as abscissa and the peak power value presenting the presence/absence of correlation is plotted as ordinate. It is understood that the peak power value is lowered as the first number p becomes higher.

Therefore, when the first number p is high and there is influence of noise during transmission, the receiving end may fail to determine the elements to extract from the converted data correctly. Conducting simulation in advance, a preferable first number p can be set based on the PAPR, transmission rate, peak correlation value, and so on.

It was found in the above-described simulation that the PAPR can be lowered by creating baseband signals through the IFFT of data created by arranging a first number of elements of subcarrier modulated signals and a second number of elements of a data series for combining. Furthermore, the degree of the PAPR being lowered can be controlled by changing the first number.

The embodiment of the present invention is not confined to the above-described embodiment. The modulation scheme of the modulator 11 is not confined to the QPSK. Besides the QPSK, the PSK (phase shift keying), QAM (quadrature amplitude modulation), and the like can be used. The modulator 11 and series/parallel converter 12 can be provided in the opposite order so that the input signals are series/parallel-converted and assigned to subcarrier signals and the parallel signal data are modulated with a given modulation scheme. In such a case, the demodulator 31 and parallel/series converter 32 at the receiving end are provided in the opposite order for demodulation. The arithmetic operator 13 can use a PN (pseudorandom noise) series and the like instead of a CAZAC series. The IFFT executors 14 and 36 can be configured to execute the IDFT instead of the IFFT. The FFT executor 34 can be configured to execute the DFT instead of the FFT.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

1 Communication device
10 Antenna
11 Modulator
12 Series/parallel converter
13 Arithmetic operator (arithmetic operation means, update means)
14 IFFT executor
15 Combiner
16 Determiner
17 Transmitter
20 Controller (control means, receiving end control means)
21 CPU
22 I/O
23 RAM
24 ROM
31 Demodulator
32 Parallel-series converter
33 Extractor
34 FFT executor
35 Correlation determiner
36 IFFT executor (shift means)
37 Shifter (shift means)
38 Series/parallel converter
39 Receiver
40 Transmission/reception switcher

What is claimed is:

1. A communication device communicating with other devices through wireless communication of an orthogonal frequency-division multiplexing communication scheme, comprising:

a modulator modulating input signals with a given modulation scheme, and assigning the elements of given remaining data and the elements of the modulated input signals to subcarriers of which the frequency components are orthogonal to each other to create subcarrier modulated signals;

an arithmetic operator arranging in sequence and combining a first number of elements from the first one among the elements of the subcarrier modulated signals and a second number of elements from the first one among the elements of a given data series each multiplied by a given amplitude coefficient to create arithmetic operation data, the given data series comprising a set of data and having such an autocorrelation property that the autocorrelation value to the same data series in which the data are not shifted is higher than the autocorrelation value to a data series in which the data are shifted;

an IFFT executor executing the inverse fast Fourier transformation of the arithmetic operation data;

a combiner combining the arithmetic operation results from the IFFT executor to create baseband signals;

a determiner calculating the peak-to-average power ratio of the baseband signals and determining whether the peak-to-average power ratio complies with a given criterion;

a controller repeatedly executing the processing of the arithmetic operator, IFFT executor, combiner, and determiner while changing at least one of the first and second numbers until the baseband signals of which the peak-to-average power ratio complies with the given criterion are detected;

an updater updating the remaining data with data comprising the elements that are not contained in the arithmetic operation data corresponding to the baseband signals complying with the given criterion among the elements of the subcarrier modulated signals; and a transmitter creating transmission signals from the baseband signals complying with the given criterion and transmitting the transmission signals.

2. The communication device according to claim 1, wherein the arithmetic operator uses a CAZAC (constant amplitude zero auto-correlation) series as the data series.

3. The communication device of claim 1 further comprising:

a receiver receiving transmission signals and creating baseband signals;

a series/parallel converter series/parallel-converting the baseband signals to create parallel signals;

an FFT executor executing the fast Fourier transformation of the parallel signals to create converted data;

a shifter shifting a given data series in a given direction to create a receiving end data series, the given data series comprising a set of data and having such an autocorrelation property that the autocorrelation value to the same data series in which the data are not shifted is higher than the autocorrelation value to a data series in which the data are shifted;

a correlation determiner determining whether there is any correlation between two given data created from the receiving end data series and from the parallel signals;

a receiving end controller repeating the processing of the shifter and correlation determiner while changing the number of times of shifting the data series until the correlation determiner determines that there is any correlation;

an extractor determining the elements to extract from the converted data based on the direction and number of times of data shifting used by the shifter and extracting the elements from the converted data to create subcarrier modulated signals in order to create the receiving end data series used by the correlation determiner for determining the correlation; and a demodulator demodulating the subcarrier modulated signals with a given demodulation scheme.

4. The communication device according to claim 3, wherein:
the shifter executes the inverse fast Fourier transformation of the created receiving end data series, and
the correlation determiner determines whether there is any correlation between the results of the inverse fast Fourier transformation of the receiving end data series and the parallel signals.

5. The communication device according to claim 3, wherein:
the correlation determiner determines whether there is any correlation between the receiving end data series and the converted data.

6. The communication device according to claim 3, wherein:
the shifter uses a CAZAC (constant amplitude zero auto-correlation) series as the data series.

7. A communication method executed by a communication device communicating with other devices through wireless communication of an orthogonal frequency-division multiplexing communication scheme, comprising:
a modulation step of modulating input signals with a given modulation scheme, and assigning the elements of remaining data and the elements of the modulated input signals to subcarriers of which the frequency components are orthogonal to each other to create subcarrier modulated signals;
an arithmetic operation step of arranging in sequence and combining a first number of elements from the first one among the elements of the subcarrier modulated signals and a second number of elements from the first one among the elements of a given data series each multiplied by a given amplitude coefficient to create arithmetic operation data, the given data series comprising a set of data and having such an autocorrelation property that the autocorrelation value to the same data series in which the data are not shifted is higher than the autocorrelation value to a data series in which the data are shifted;
an IFFT step of executing the inverse fast Fourier transformation of the arithmetic operation data;
a combining step of combining the arithmetic operation results in the IFFT step to create baseband signals;
a determination step of calculating the peak-to-average power ratio of the baseband signals and determining whether the peak-to-average power ratio complies with a given criterion;
a control step of repeatedly executing the processing in the arithmetic operation, IFFT, combining, and determination steps while changing at least one of the first and second numbers until the baseband signals of which the peak-to-average power ratio complies with the given criterion are detected;
an update step of updating the remaining data with data comprising the elements that are not contained in the arithmetic operation data corresponding to the baseband signals complying with the given criterion among the elements of the subcarrier modulated signals; and
a transmission step of creating transmission signals from the baseband signals complying with the given criterion and transmitting the transmission signals.

8. The communication method according to claim 7, wherein in the arithmetic operation step, a CAZAC (constant amplitude zero auto-correlation) series is used as the data series.

9. The communication method of claim 7 further comprising:
a reception step of receiving transmission signals and creating baseband signals;
a series/parallel step of series/parallel-converting the baseband signals to create parallel signals;
an FFT step of executing the fast Fourier transformation of the parallel signals to create converted data;
a shift step of shifting a given data series a given number of times in a given direction to create a receiving end data series, the given data series comprising a set of data and having such an autocorrelation property that the autocorrelation value to the same data series in which the data are not shifted is higher than the autocorrelation value to a data series in which the data are shifted;
a correlation determination step of determining whether there is any correlation between two given data created from the receiving end data series and from the parallel signals;
a receiving end control step of repeating the shift step and correlation determination step while changing the number of times of shifting the data series until it is determined that there is any correlation in the correlation determination step;
an extraction step of determining given elements to extract from the converted data based on the direction and number of times of data shifting used in the shift step and extracting the given elements from the converted data to create subcarrier modulated signals in order to create the receiving end data series used for determining the correlation in the correlation determination step; and
a demodulation step of demodulating the subcarrier modulated signals with a given demodulation scheme.

10. The communication method according to claim 9, wherein:
in the shift step, the inverse fast Fourier transformation of the created receiving end data series is executed, and
in the correlation determination step, it is determined whether there is any correlation between the results of the inverse fast Fourier transformation of the receiving end data series and the parallel signals.

11. The communication method according to claim 9, wherein:
in the correlation determination step, it is determined whether there is any correlation between the receiving end data series and the converted data.

12. The communication method according to claim 9, wherein:
in the shift step, a CAZAC (constant amplitude zero auto-correlation) series is used as the data series.

* * * * *